(12) United States Patent
Pocock

(10) Patent No.: US 11,500,857 B2
(45) Date of Patent: Nov. 15, 2022

(54) ASYNCHRONOUS REMOTE CALLS WITH UNDO DATA STRUCTURES

(71) Applicant: salesforce.com, inc., San Francisco, CA (US)

(72) Inventor: Trevor Pocock, Jena (DE)

(73) Assignee: Salesforce, Inc., San Francisco, CA (US)

( * ) Notice: Subject to any disclaimer, the term of this patent is extended or adjusted under 35 U.S.C. 154(b) by 163 days.

(21) Appl. No.: 16/823,722

(22) Filed: Mar. 19, 2020

(65) Prior Publication Data

US 2021/0240698 A1 Aug. 5, 2021

Related U.S. Application Data

(60) Provisional application No. 62/968,336, filed on Jan. 31, 2020.

(51) Int. Cl.
*G06F 16/20* (2019.01)
*G06F 16/23* (2019.01)
*G06F 9/54* (2006.01)

(52) U.S. Cl.
CPC .......... *G06F 16/2379* (2019.01); *G06F 9/547* (2013.01)

(58) Field of Classification Search
CPC ... G06F 16/2379; G06F 9/547; G06F 11/1474
USPC ........................................................ 707/703
See application file for complete search history.

(56) References Cited

U.S. PATENT DOCUMENTS

| | | | |
|---|---|---|---|
| 6,529,932 B1* | 3/2003 | Dadiomov | G06F 9/466 709/201 |
| 2004/0039654 A1 | 2/2004 | Schambach | |
| 2006/0184941 A1* | 8/2006 | Urban | G06F 11/1479 718/100 |
| 2007/0061383 A1* | 3/2007 | Ozawa | G06F 11/1471 707/999.202 |

* cited by examiner

*Primary Examiner* — Vincent F Boccio
(74) *Attorney, Agent, or Firm* — Butzel Long

(57) ABSTRACT

Systems, device and techniques are disclosed for asynchronous remote call with undo data structures. A remote call associated with a database transaction in a local database may be prepared. An undo data structure for the remote call may be stored in a storage. The remote call associated with the database transaction may be transmitted to a remote computing device to be executed by the remote computing device. Performance of the database transaction may begin in the local database. The performance of the database transaction or the remote call has may be determined to have failed. The undo data structure may be transmitted to the remote computing device to be executed.

20 Claims, 13 Drawing Sheets

ASYNCHRONOUS REMOTE CALLS WITH UNDO DATA STRUCTURES

BACKGROUND

Transactions in a local database may involve remote calls to remote services. A transaction in the local database and the results of the remote call to a remote service for that transaction may need to be kept consistent, and the transaction in the local database may not be committed until the remote call completes successfully. Performing the remote call synchronously with the transaction to the local database to ensure that the transaction is not committed until the remote call is successful may result in performance degradation in the local database.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
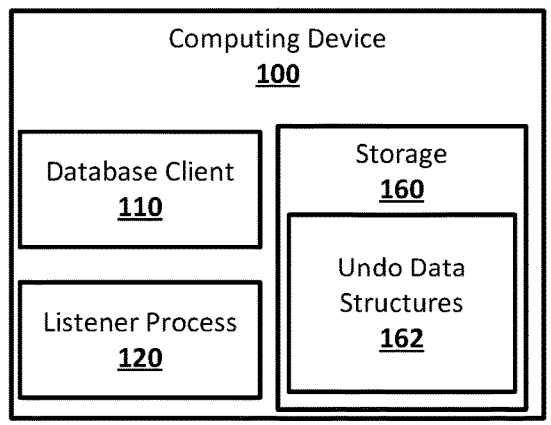
FIG. 1 shows an example system for asynchronous remote calls with undo data structures according to an implementation of the disclosed subject matter.

Techniques disclosed herein enable asynchronous remote calls with undo data structures, which may allow for a remote call to a remote service to be made asynchronously with a database transaction in a local database, and for the remote call to be undone if the remote call or the database transaction in the local database fails. A computing device may prepare a remote call associated with a database transaction in a local database. The remote call may be a call to a service on the remote computing device. An undo data structure for the remote call may be generated and stored in a storage of the computing device. The computing device may then transmit the remote call associated with the database transaction to be executed on a remote computing device, and may also begin the database transaction in the local database. If the database transaction in the local database is successful and the remote call completes successfully, the computing device may commit the database transaction and delete the undo data structure from the storage. If the database transaction fails or the remote call fails, the database transaction may be rolled back and the undo data structure may be remotely executed on the remote computing device, undoing the remote call associated with the database transaction. If the computing device enters an unknown state and is restarted before any number of database transactions complete in the local database, all undo data structures in the storage older than a specified age may be executed on remote computing devices, undoing any remote calls associated with the database transactions that were not completed before the computing device entered the unknown state.

A computing device may prepare a remote call associated with a database transaction in a local database. The local database may be local to the computing device, such that the computing device may be able perform database transactions directly in the local database. The local database may be stored in any suitable manner. For example, the computing device may be a part of a server system, and the local database may be stored in storage that is directly accessible to computing devices of the server system. The remote call may be a remote procedure call (RPC) to a remote service on a remote computing device, and may make some change to the remote computing device. The remote call may, for example, call a remote service that may cause the remote computing device to perform a second database transaction in a remote database that is local to the remote computing device. For example, the database transaction in the local database may be generated on the computing device from an order for a quantity of a product submitted through a webpage hosted by the computing device. A remote call associated with this database transaction may be to a remote service on a remote computing device responsible for tracking the quantity of the product available and reserving the appropriate quantity of the product when an order is placed through the webpage hosted by the computing device. The remote service may, on receiving the remote call, begin the second database transaction in the remote database, for example, to reserve the appropriate quantity of the product to ensure fulfillment of the order that generated the database transaction in the local database. The remote call associated with the database transaction may be prepared by the computing device before the database transaction begins in the local database.

The computing device may run a listener process. The listener process may, for example, run in a thread separate from a thread responsible for performing the database transaction. The remote call may be registered with the listener process after being prepared by the computing device before the remote call is sent to be executed on a remote computing device. The remote call may be registered with the listener process by providing the listener process with any suitable identifiers for the remote call.

The computing device may generate and store an undo data structure for undoing the remote call associated with the database transaction. The undo data structure may be stored in storage for undo data structures that is accessible to the computing device, and may be stored separately from the database transaction. The storage for undo data structures may be separate from the local database, or may be a separate transactional context within the local database. The undo data structure may be generated to include data that may be usable to undo the effects of the remote call on the remote computing device. For example, the undo data structure may include data that may be usable to reverse a database transaction in a remote database performed by the remote computing device based on the remote call. The undo data structure may, for example, include any suitable identifiers for the remote call, data describing the effects of the remote call, instructions for undoing the remote call, or any other suitable data. This may allow a remote computing device on which the undo data structure is executed to determine if the remote call the undo data structure undoes was successfully or partially executed by the remote computing device, and if it was, to determine how to undo any changes made by the successful or partial execution of the remote call. For example, an undo data structure for a remote call that performs a remote database transaction that reserves a quantity of a product may include an identifier for the remote call, data describing that the remote call reserves the quantity of the product, including a suitable identifier for the product, a number for the quantity reserved, and an indicator of the nature of the remote database transaction used for reservation, and an instructions that may be used by the remote computing device to reverse the reservation. Multiple undo data structures may be stored in the storage for undo data structures at the same time, each for undoing a separate remote call associated with a separate database transaction.

The computing device may transmit the remote call to the remote computing device before beginning the database transaction in the local database, and after the undo data structure has been successfully stored. The remote call may not be transmitted until after the undo data structure has been successfully stored in order to ensure that an undo data structure is available should the remote call need to be undone. The remote call may be transmitted before the computing device begins the database transaction in the local database. This may allow the remote call and the database transaction in the local database to execute asynchronously, improving performance of the local database. The remote call may be prepared and executed before the computing device begins executing code for the database transaction in the local database. Because the remote call and the database transaction are asynchronous, the code to execute the database transaction in the local database may run and complete all local work for the database transaction in the local database while the remote call is being executed on the remote computing device, as the code to execute the database transaction will not be blocked waiting for the remote call to complete successfully. After the remote call is transmitted to the remote computing device, the listener process on the computing device may listen for confirmation from the remote computing device that the remote call was successfully executed on the remote computing device.

If the computing device determines that the database transaction in the local database has been successful and that the remote call has completed successfully, the computing device may commit the transaction to the local database and delete the undo data structure stored for undoing the remote call from the storage for the undo data structures. For example, the listener process may receive a message from the remote computing device including identifiers for the remote call and an indication that the remote call successfully completed on the remote computing device. The listener process may then delete the undo structure for undoing the remote call from the storage for undo data structures. The computing device may commit the database transaction in the local database, as the database transaction will not need to be rolled back to due to failure of the database transaction or the remote call.

If the computing device determines that either of the database transaction in the local database and the remote call has failed, the database transaction may be rolled back, and the undo data structure may be sent for remote execution on the remote computing device. For example, the database transaction in the local database may fail for any reason, and the failure may be detected by the computing device as a database transaction failure. The listener process may receive a message from the remote computing device including identifiers for the remote call and an indication that the remote call failed, or the listener process may detect that the remote call has timed-out with no response from the remote computing device after waiting for any suitable period of time, both of which may be detected by the computing device as remote call failures for the database transaction.

On detection of either or both of a database transaction failure and a remote call failure for the database transaction, the computing device may rollback the database transaction in the local database and the listener process of the computing device may transmit the undo data structure for undoing the remote call to be remotely executed on the remote computing device. The rollback of the database transaction may reverse any changes to the local database resulting from any work done for the database transaction up to the time when the computing device initiates the rollback. For example, if the database transaction was completed when a remote call failure for the database transaction was detected, the rollback may reverse the entire database transaction. If the database transaction was partially completed when either a database transaction failure or remote call failure for the database transaction was detected, the rollback may reverse the parts of the database transaction that were completed by the time the computing device initiates the rollback.

The remote execution on the remote computing device of the undo data structure transmitted by the listener process may reverse any changes made to the remote computing device, such as, for example, to a remote database that is local to the remote computing device, by the remote call. For example, if the remote call completed successfully on the remote computing device and a database transaction failure was detected on the local computing device, the remote execution of the undo data structure may undo any changes made in response to the remote call, for example, by the remote service, by, for example, rolling back a transaction in the remote database. If the remote call did not complete successfully on the remote computing device, either due to a remote call failure or due to a database transaction failure being detected and the undo data structure being transmitted before the remote call could complete successfully, remotely executing the undo structure may undo any portion of the remote call that had been completed at the time of execution of the undo data structure. In executing the undo data structure, the remote computing device may use the identifiers in the undo data structure to identify the remote call to undo and determine the current state of the remote call, for example, whether it completed successfully, is partially completed, or is totally non-completed. The remote computing device may use data describing the remote call in the undo data structure in determining the current state of the remote call, for example, comparing a described database transaction in the undo data structure to changes made to the remote database. The undo data structure may also include instructions for undoing the remote call. The instructions may be executable by the remote computing device, and may undo any changes made by the remote call. For example, if the remote call caused a remote service to perform a reservation transaction in the remote database, reserving a quantity of a product, the undo data structure may include an instruction to cancel the reservation, undoing the reservation transaction and un-reserving the quantity of the product that was reserved. After transmitting the undo data structure to the remote computing device, the listener process may delete the undo data structure from the storage for undo data structures.

If the computing device enters an unknown state and is restarted before any number of database transactions complete, all undo data structures in the storage for undo data structures older than a specified age may be executed on remote computing devices, undoing any remote calls associated with the database transactions that were not completed before the computing device entered the unknown state. For example, the computing device may crash, freeze, lose power, or shut down unexpectedly for any reason, entering an unknown state. Before entering the unknown state, the computing device may have been performing any number of database transactions in the local database, and undo data structures may have been stored in the undo data structure storage for undoing the remote calls associated with the database transactions. The database transactions in the local database may have failed when the computing device entered the unknown state. When the computing device returns from the unknown state, the listener process may resume, and may transmit any undo data structures older than a specified age, for example, stored for longer than a specified amount of time, in the storage for undo data structures to be remotely executed on the appropriate remote computing devices. The listener process may then delete the undo data structures transmitted to the remote computing devices. For example, the listener process may transmit undo data structures that are older than one minute, for example, stored in the storage for undo data structures for more than one minute, to the remote computing devices that that received the remote calls that are undone by the undo data structures, and may then delete those undo data structures from the storage for undo data structures. This may ensure that remote calls associated with any of the database transactions that failed when the computing device entered the unknown state are undone while not undoing any remote calls associated with database transactions that began after the computing device returned from the unknown state.

FIG. 1 shows an example system for asynchronous remote calls with undo data structures according to an implementation of the disclosed subject matter. A computing device 100 may be any suitable computing device, such as, for example, a computer 20 as described in FIG. 8, or component thereof. The computing device 100 may include a database client 110, listener process 120, and a storage 160. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs). The computing device 100 may, for example, be part of a server system that commits database transactions in a local database.

The database client 110 may be any suitable combination of hardware and software on the computing device 100 for performing database transactions in a local database. To commit a database transaction to the local database, the database client 110 may, for example, prepare and transmit a remote call associated with the database transaction to a remote computing device, store an undo data structure that undoes the remote call in the storage 160, perform the database transaction in the local database, and commit the database transaction in the local database when the database transaction and the remote call are both successful. The database client 110 may also rollback a database transaction performed in the local database when the database transaction or remote call associated with the database transaction fail.

The listener process 120 may be any suitable process running on the computing device 100 for listening for messages regarding the remote execution of a remote call and transmitting and deleting undo data structures. The listener process 120 may be, for example, a thread of the database client 110, or an entirely separate thread or process running on the computing device 100. A remote call generated by the database client 110 may be registered with the listener process 120, which may listen for messages from the remote computing device to which the remote call is sent to determine whether the remote call succeeded or failed. If the remote call and its associated database transaction are both successful, the database transaction may be committed by the database client 110 and the listener process 120 may delete the undo data structure that undoes the remote call from the storage 160. If the database transaction or remote call fail and the database client 110 rolls back the database transaction, the listener process 120 may transmit the undo data structure that undoes the remote call to be remotely executed on the remote computing device and then delete the undo data structure from the storage 160. If the computing device 100 has returned to operation from an unknown state, for example, after a freeze or crash, the listener process 120 may send any undo data structures in the storage 160 older than a specified age, for example, stored in the storage 160 for longer than a specified amount of time, to the appropriate remote computing device to undo remote calls associated with database transactions that may have failed when the computing device 100 entered the unknown state.

The storage 160 may be any suitable combination of hardware and software for storing data. The storage 160 may include any suitable combination of volatile and non-volatile storage hardware, and may include components of the computing device 100 and hardware accessible to the computing device 100, for example, through wired and wireless direct or network connections. The storage 160 may store undo data structures 162, which may include all undo data structures that undo remote calls for database transactions that database client 110 started performing but has not yet successfully committed to the local database.

Figure 2A:
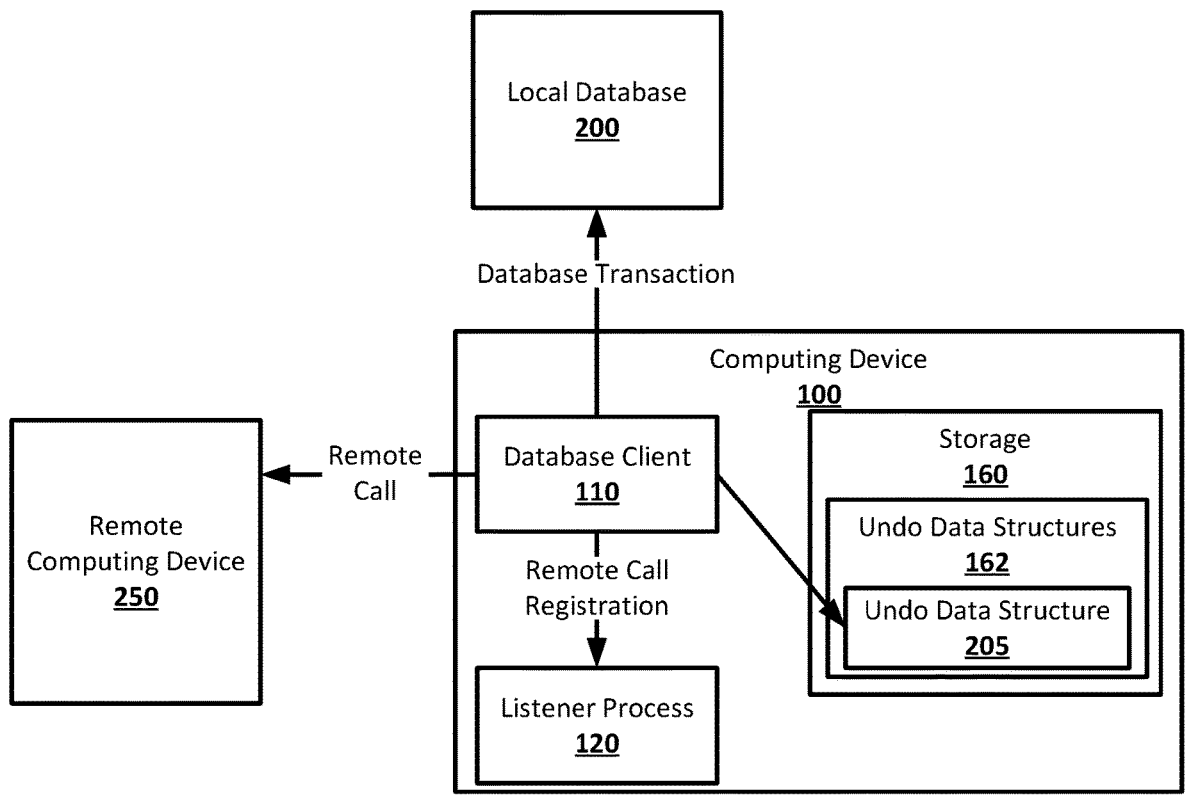
FIG. 2A shows an example arrangement for asynchronous remote calls with undo data structures according to an implementation of the disclosed subject matter.

FIG. 2A shows an example arrangement for asynchronous remote calls with undo data structures according to an implementation of the disclosed subject matter. The database client 110 may begin commitment of a database transaction. The database transaction may be generated in any suitable manner, originating from any suitable source. For example, the database transaction may be generated from an order input to a webpage for a store hosted by the computing device 100, or by a server system that may transmit orders to the computing device 100. The database transaction may be a transaction intended to be committed in a local database 200. The local database 200 may be any suitable database to which the computing device 100 may directly commit database transactions. The local database 200 may, for example, be a database stored on the computing device 100, for example, in the storage 160, or may be part of a server system with the computing device 100. The local database 200 may include any suitable hardware and software for implementing a database.

The database transaction may include an associated remote call. The remote call may be a remote procedure call to a remote service on a remote computing device 250. The remote computing device 250 may be any suitable computing device, such as, for example, a computer 20 as described in FIG. 8, or component thereof. The remote computing device 250 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The remote computing device 250 may be part of a computing system and network infrastructure, or may be otherwise connected to the computing system and network infrastructure, including a larger server network which may include other server systems similar to the remote computing device 250. The remote computing device 250 may include any suitable combination of central processing units (CPUs), graphical processing units (GPUs), and tensor processing units (TPUs).

The remote call may be a procedure call to a service on the remote computing device 250 that may make changes to the remote computing device 250, for example, to a database, that may be necessary to maintain consistency between the remote computing device 250 and the local database 200 and allow the database transaction to be committed to the local database 200. The database client 110 may generate an undo data structure 205 for undoing the remote call. The undo data structure 205 may include any suitable identifiers for the remote call, and any suitable data and instructions to allow remote execution of the undo data structure 205 to undo the remote call. The database client 110 may store the undo data structure 205 as one of the undo data structures 162 in the storage 160.

After successfully storing the undo data structure 205, the database client 110 may register the remote call with the listener process 120. For example, the database client 110 may provide the identifiers of the remote call to the listener process 120, so that the listener process 120 may be able to identify messages received at the computing device 100 that concern the status of the remote call, and may be able to identify the undo data structure 205 from the storage 160 as being for undoing the remote call and being associated with the database transaction.

The database client 110 may, after registering the remote call with the listener process 120, transmit the remote call to the remote computing device 250. The remote call may be transmitted to the remote computing device 250 in any suitable manner, using any suitable wired or wireless connection of the computing device 100, through any suitable public or private network, including, for example, the Internet. After the remote call has been transmitted to the remote computing device 250, the database client 110 may perform the database transaction in the local database 200, for example, executing code for the database transaction. This may result in the database transaction and the remote call being executed asynchronously.

Figure 2B:
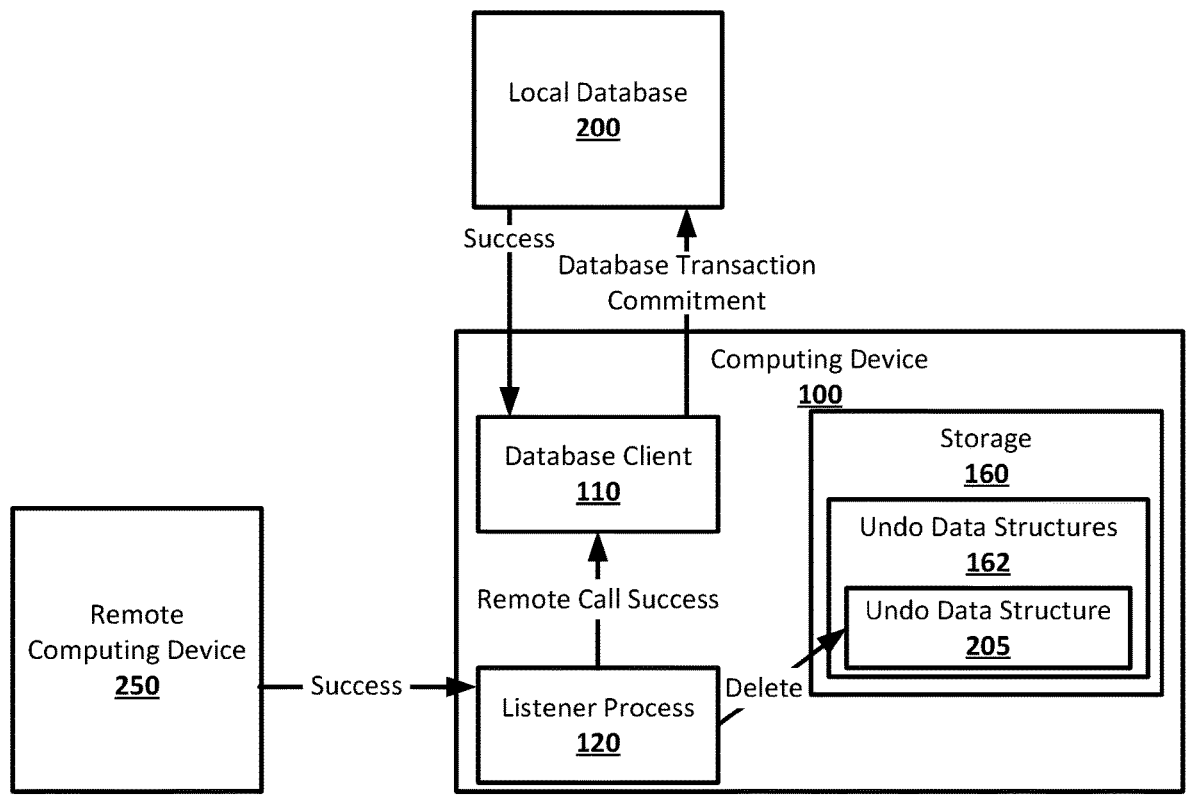
FIG. 2B shows an example arrangement for asynchronous remote calls with undo data structures according to an implementation of the disclosed subject matter.

FIG. 2B shows an example arrangement for asynchronous remote calls with undo data structures according to an implementation of the disclosed subject matter. The database client 110 may successfully perform the database transaction in the local database 200. The listener process 120 may receive a message from the remote computing device 250 indicating that the remote call completed successfully on the remote computing device 250. The listener process 120 may notify the database client 110 that the remote call completed successfully, and may delete the undo data structure 205 from the storage 160. The listener process 120 may identify the undo data structure 205 from among the undo data structures 162 based on any suitable identifiers for the remote call in the success message received from the remote computing device 250. The database client 110, in response to the success of both the performance of the database transaction and the remote call, may commit the database transaction in the local database 200.

Figure 2C:
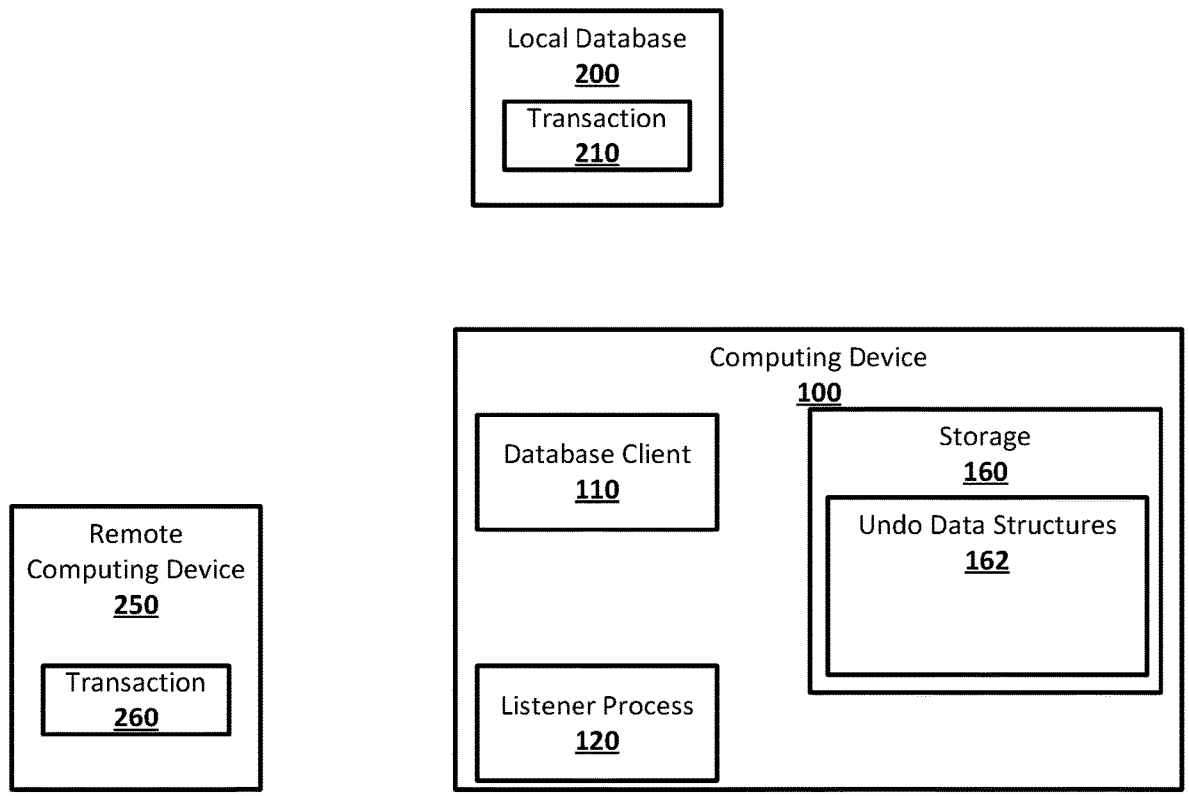
FIG. 2C shows an example arrangement for asynchronous remote calls with undo data structures according to an implementation of the disclosed subject matter.

FIG. 2C shows an example arrangement for asynchronous remote calls with undo data structures according to an implementation of the disclosed subject matter. Commitment of the database transaction by the database client 110 may result in the transaction 210 being stored as part of the local database 200. Transaction 210 may include any changes made to the local database by the performance and commitment of the database transaction by the database client 110, including, for example, changes, additions, or deletions of any data in the local database 200.

Success of the remote call may result in appropriate changes on the remote computing device 250, such as, for example, transaction 260 being stored as part of a remote database that is local to, and may be stored on, the remote computing device 250. The transaction 260 may include any changes made to the remote computing device 250 by the successful remote call, including, for example, changes, additions, or deletions of any data on the remote computing device 250.

Deleting of the undo data structure 205 from the storage 160 by the listener process 120 may remove the undo data structure 205, as the remote call undone by the undo structure 205 and the associated database transaction may have completed successfully.

Figure 3:
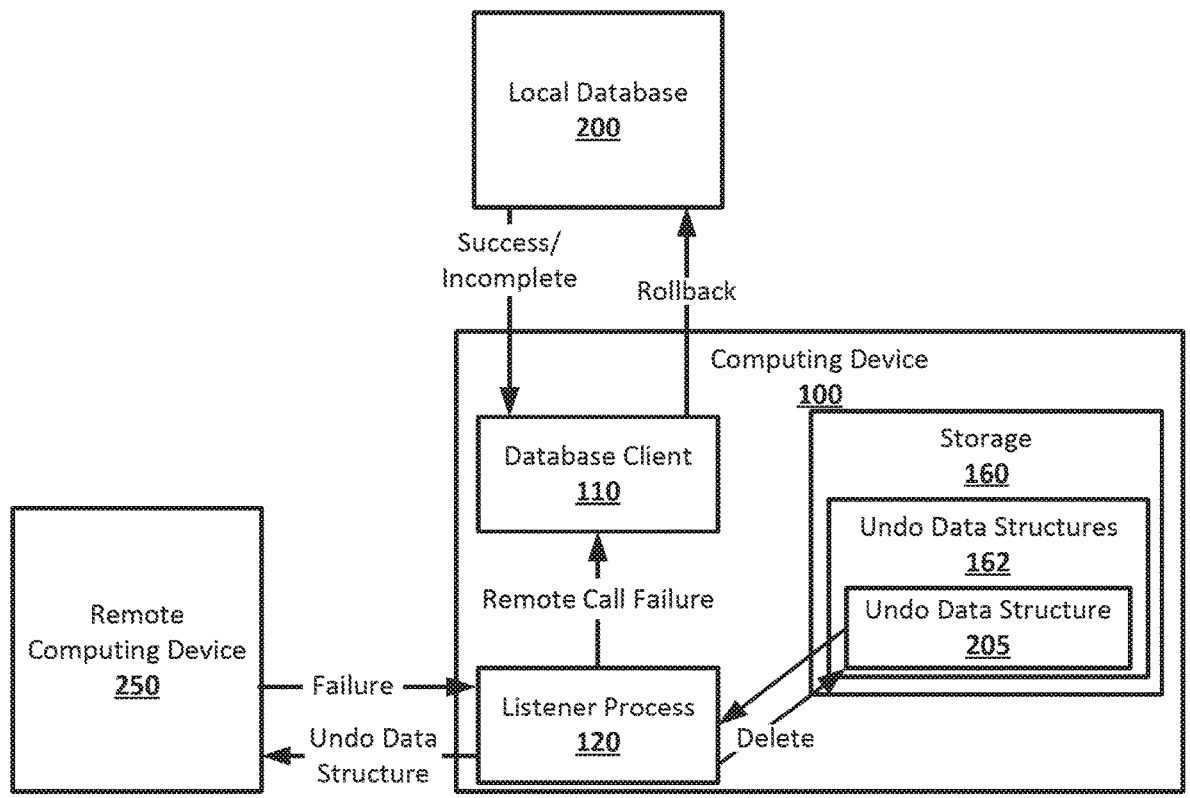
FIG. 3 shows an example arrangement for asynchronous remote calls with undo data structures according to an implementation of the disclosed subject matter.

FIG. 3 shows an example arrangement for asynchronous remote calls with undo data structures according to an implementation of the disclosed subject matter. The listener process 120 may receive a message from the remote computing device 250 indicating that the remote call failed on the remote computing device 250. At the time the listener process 120 receives the failure message, the database transaction in the local database 200 may have completed successfully, or may be incomplete. The listener process 120 may notify the database client 110 that the remote call failed, and may transmit the undo data structure 205 to the remote computing device 250 to be remotely executed and then delete the undo data structure 205 from the storage 160. The listener process 120 may identify the undo data structure 205 from among the undo data structures 162 based on any suitable identifiers for the remote call. The database client 110, in response to the failure of the remote call, may rollback the database transaction in the local database 200 from whatever state the database transaction is currently in.

Figure 4:
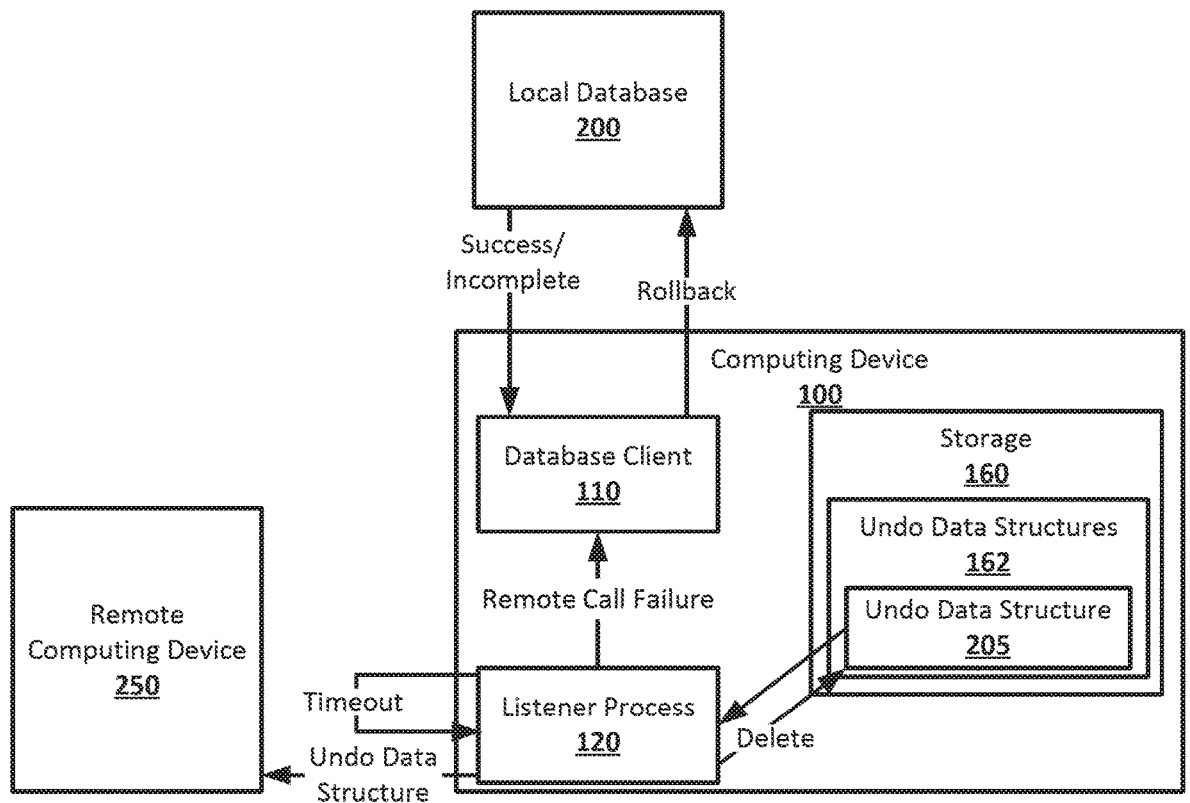
FIG. 4 shows an example arrangement for asynchronous remote calls with undo data structures according to an implementation of the disclosed subject matter.

FIG. 4 shows an example arrangement for asynchronous remote calls with undo data structures according to an implementation of the disclosed subject matter. The listener process 120 may timeout waiting for a success of failure message from the remote computing device 250. The timeout may occur after a time period of any suitable length without communication from the remote computing device 250 regarding the remote call. On timing out, the listener process 120 may consider the remote call to have failed on the remote computing device 250. At the time the listener process 120 times out waiting for a message from the remote computing device 250, the database transaction in the local database 200 may have completed successfully, or may be incomplete. The listener process 120 may notify the database client 110 that the remote call failed, and may transmit the undo data structure 205 to the remote computing device 250 to be remotely executed and then delete the undo data structure 205 from the storage 160. The listener process 120 may identify the undo data structure 205 from among the undo data structures 162 based on any suitable identifiers for the remote call. The database client 110, in response to the failure of the remote call, may rollback the database transaction in the local database 200 from whatever state the database transaction is currently in.

Figure 5:
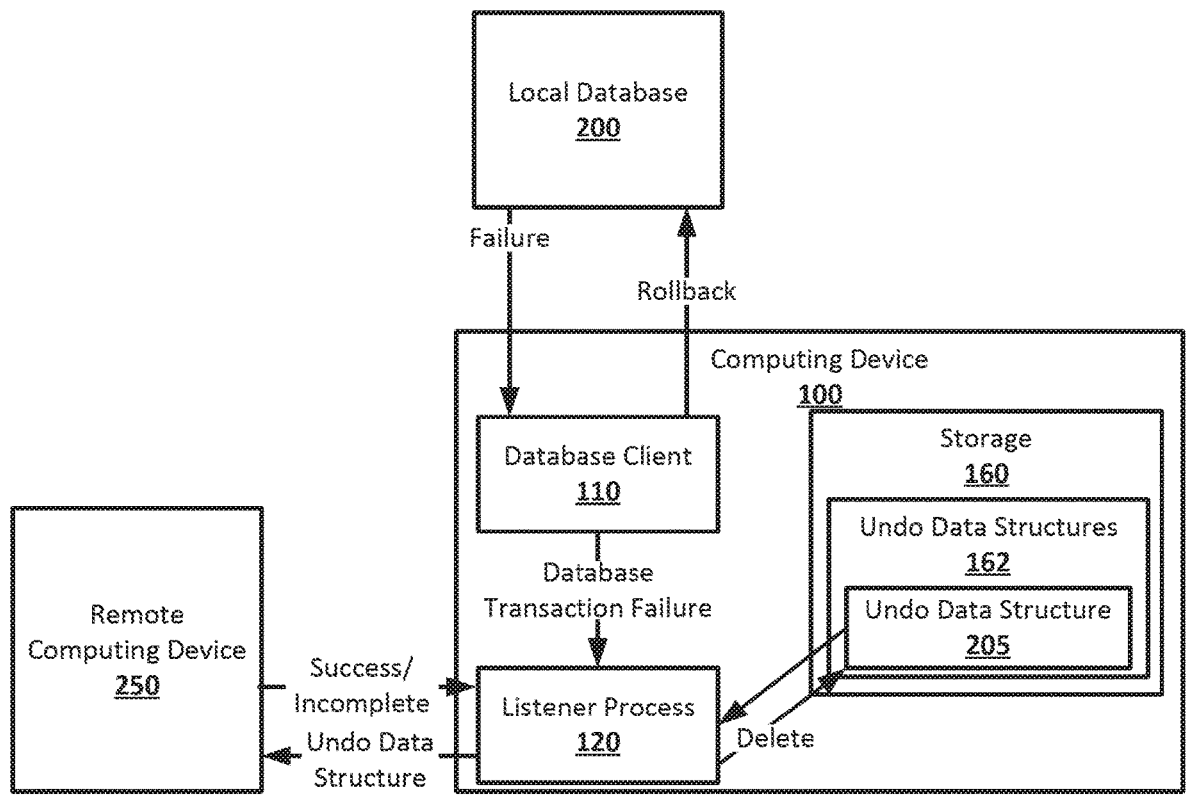
FIG. 5 shows an example arrangement for asynchronous remote calls with undo data structures according to an implementation of the disclosed subject matter.

FIG. 5 shows an example arrangement for asynchronous remote calls with undo data structures according to an implementation of the disclosed subject matter. The database transaction performed by the database client 110 in the local database 200 may fail. The database client 110 may notify the listener process 120 that the database transaction has failed, and may rollback the database transaction in the local database 200. The listener process 120 may have received a success message for the remote call from the remote computing device 250, or may still be waiting for a message from the remote computing device 250, at the time the database transaction fails in the local database 200. The listener process 120, in response to the failure of the database transaction, may transmit the undo data structure 205 to the remote computing device 250 to be remotely executed and then delete the undo data structure 205 from the storage 160. The listener process 120 may identify the undo data structure 205 from among the undo data structures 162 based on any suitable identifiers for the remote call.

Figure 6:
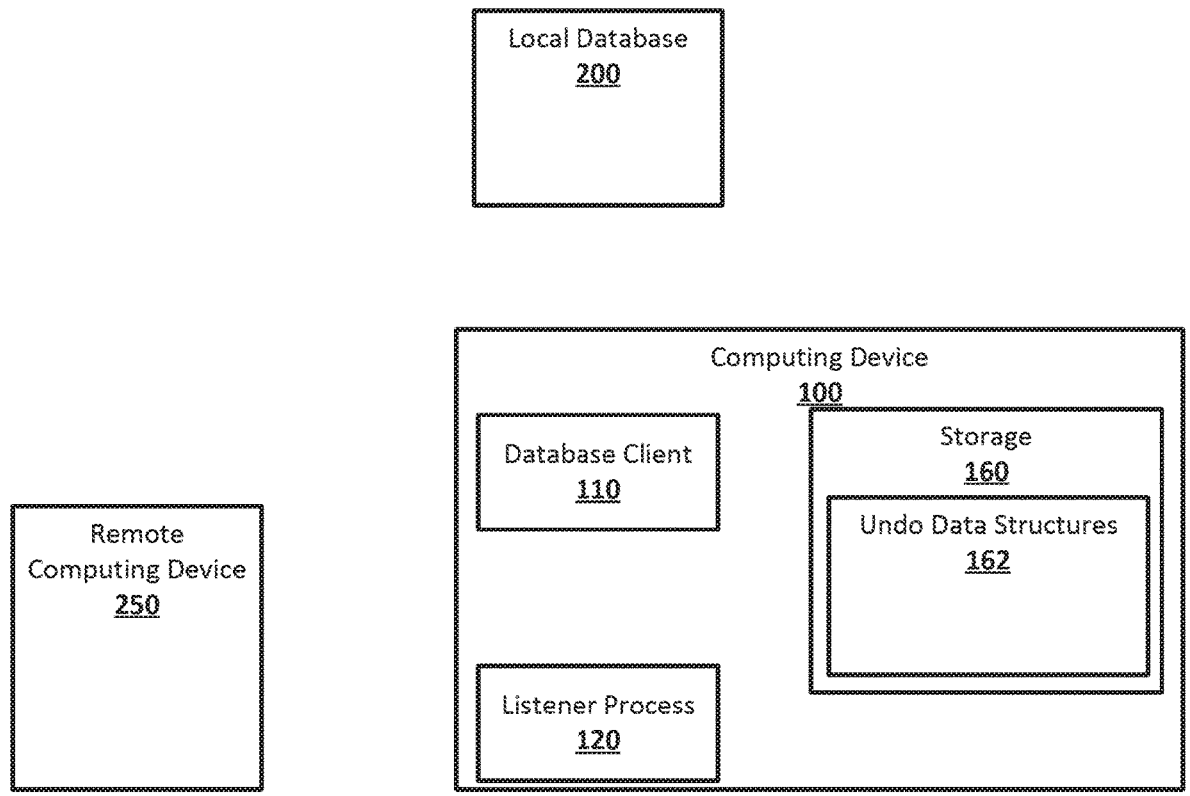
FIG. 6 shows an example arrangement for asynchronous remote calls with undo data structures according to an implementation of the disclosed subject matter.

FIG. 6 shows an example arrangement for asynchronous remote calls with undo data structures according to an implementation of the disclosed subject matter. Rollback of the database transaction by the database client 110 in response to failure of the database transaction or failure of the remote call resulting in a failure message or timing out of the listener process 120 may result in the transaction 210 not being stored as part of the local database 200. Any changes made to the local database 200 by the database transaction may be reversed by the database client 110 in rolling back the database transaction.

Remote execution of the undo data structure 205 that undoes the remote call after failure of the database transaction or failure of the remote call may result in any changes made to the remote computing device 250 by the remote call being reversed. For example, the transaction 260 may not be stored, and any changes included in the transaction 260, for example, changes, additions, or deletions of any data on the remote computing device 250, may be undone through execution of the undo data structure 205.

Deleting of the undo data structure 205 from the storage 160 by the listener process 120 may remove the undo data structure 205, as the undo structure 205 may not be needed after being transmitted to the remote computing device 250 to undo the remote call.

Figure 7A:
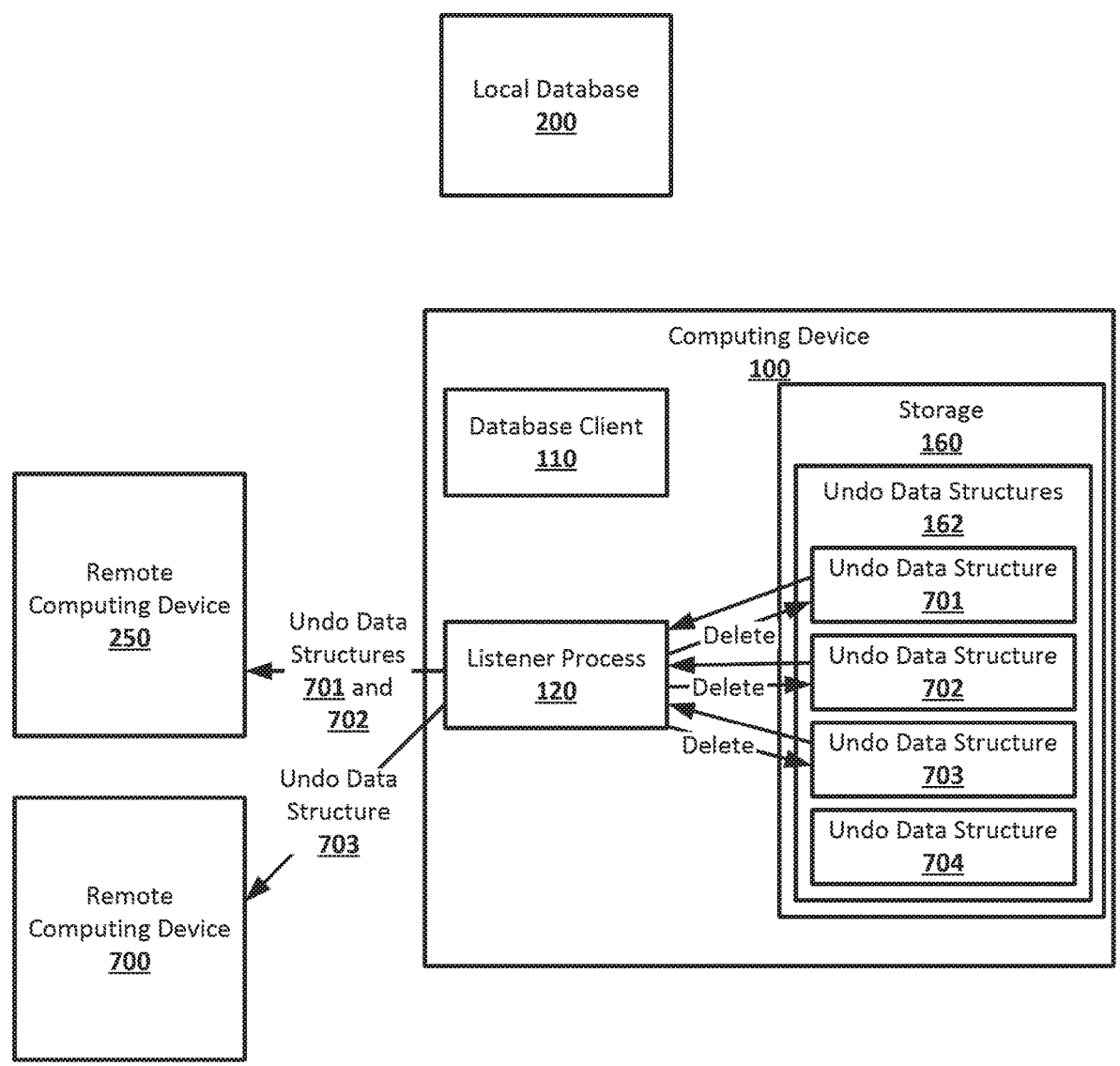
FIG. 7A shows an example arrangement for asynchronous remote calls with undo data structures according to an implementation of the disclosed subject matter.

FIG. 7A shows an example arrangement for asynchronous remote calls with undo data structures according to an implementation of the disclosed subject matter. The computing device 100 may enter an unknown state. For example, the computing device 100 may crash, freeze, lose power, or otherwise unexpectedly enter an unknown state where the computing device 100 is not running the database client 110 and the listener process 120, and where database client 110 and listener process 120 were not able to exit gracefully, for example, completing any work in progress, or saving the state of work in progress, before exiting.

At the time the computing device 100 enters the unknown state, the database client 110 may have been attempting to commit any number of database transactions to the local database 200, including having sent out remote calls associated with the database transactions. Undo data structures that undo the remote calls may have been stored in the storage 160 before the computing device 100 entered the unknown state. When the computing device 100 returns to operation from the unknown state, the database transactions that had not yet been committed to the local database 200 at the time the computing device 100 entered the unknown state may be considered to have failed.

The listener process 120, on resuming, may check the storage 160 to determine which of the undo data structures 162 are older than a specified age, for example, having been stored in the storage 160 for longer than a specified amount of time. For example, the specified amount of time may be one minute, and the listener process 120 may determine that undo data structures 701, 702 and 703 have all been stored in the storage 160 for longer than one minute, while undo data structure 704 may have been stored in the storage 160 for less than one minute. This may indicate that the undo data structures 701, 702, and 703 undo remote calls associated with database transactions that started before the computing device 100 entered the unknown state and failed when the computing device 100 entered the unknown state, while the undo data structure 704 may undo a remote call associated with a database transaction that was started after the computing device 100 returned from the unknown state.

The listener process 120 may transmit the undo data structures 701, 702, and 703, to the appropriate remote computing devices to undo the appropriate remote calls. For example, the undo data structures 701 and 702 may undo remote calls that were transmitted to the remote computing device 250. The listener process 120 may transmit the undo data structures 701 and 702 to be remotely executed on the remote computing device 250, and may then delete the undo data structures 701 and 702 from the storage 160. The undo data structure 703 may undo a remote call that was transmitted to a remote computing device 750. The listener process 120 may transmit the undo data structure 703 to be remotely executed on the remote computing device 750, and may then delete the undo data structure 703 from the storage 160. This may result in any changes made to the remote computing devices 250 and 750 by remote calls associated with database transactions that failed in the local database 200 when the computing device 100 entered the unknown state being undone, restoring consistency between the remote computing devices 250 and 750 and the local database 200.

Figure 7B:
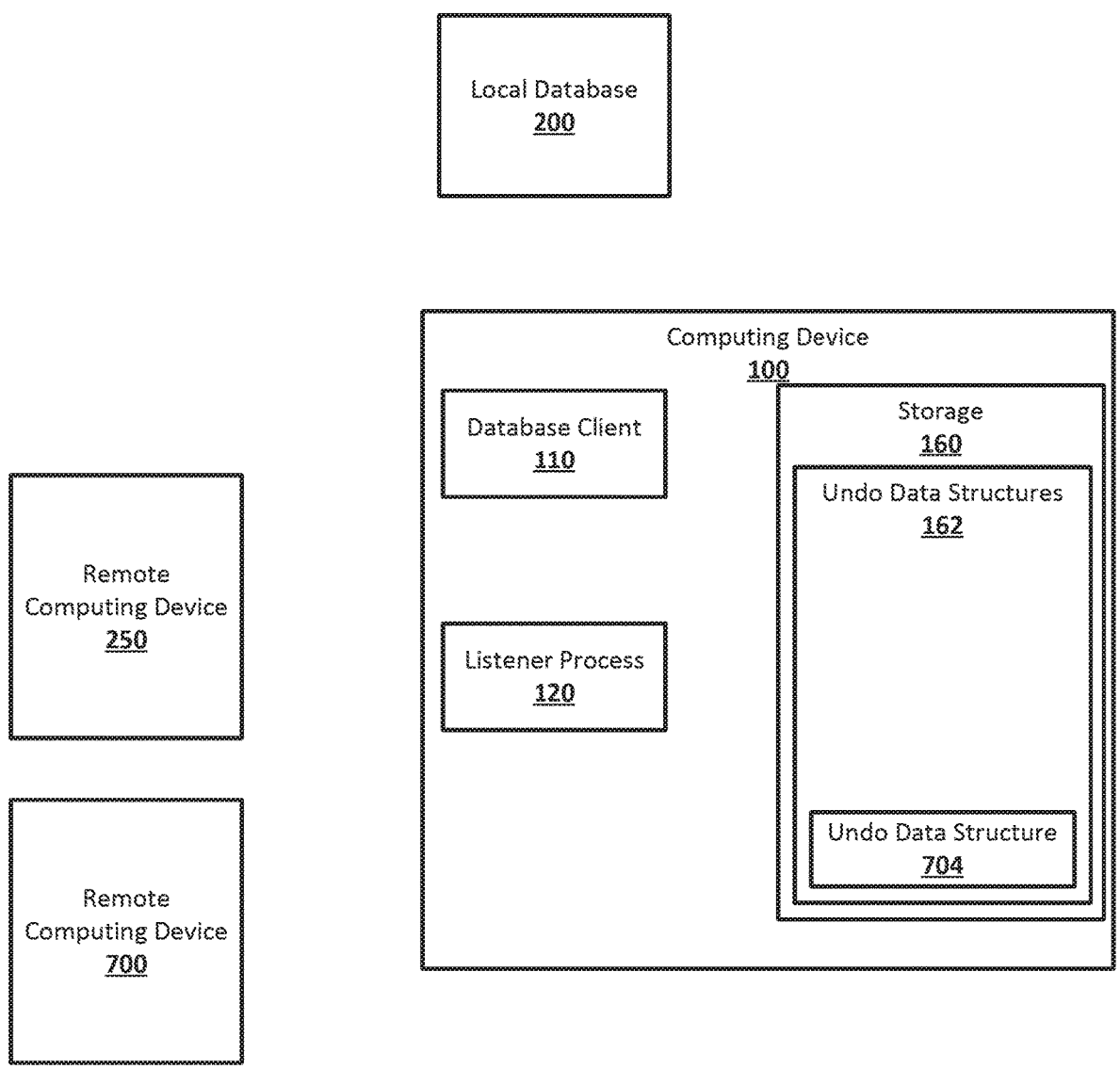
FIG. 7B shows an example arrangement for asynchronous remote calls with undo data structures according to an implementation of the disclosed subject matter.

FIG. 7B shows an example arrangement for asynchronous remote calls with undo data structures according to an implementation of the disclosed subject matter. After the listener process 120 deletes the undo data structures 701, 702, and 703 from the storage 160, the undo data structure 704 may remain in the storage 160. The undo data structure 704 may have been younger than the age used by the listener process 120 to determine which of the undo data structures 120 to send to be remotely executed and delete after the computing device 100 returns from the unknown state.

Figure 8:
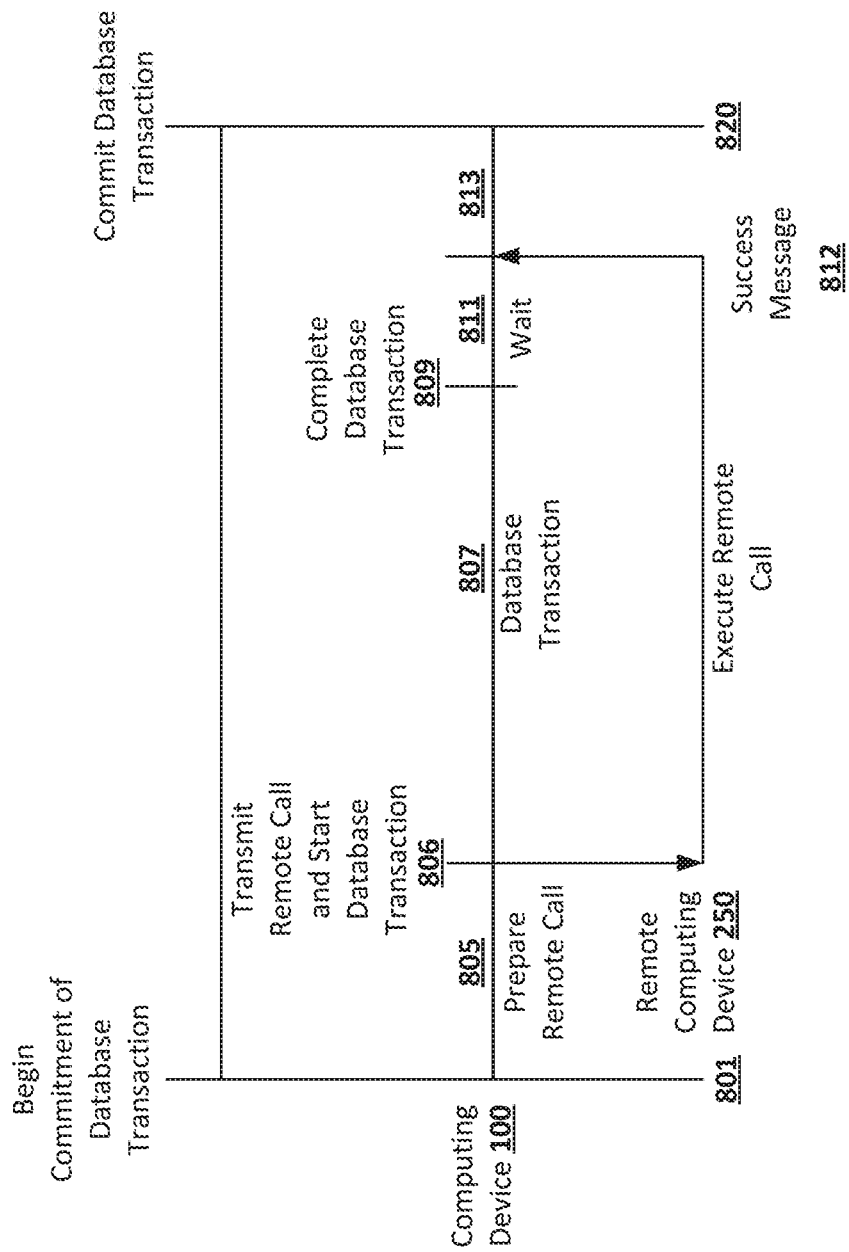
FIG. 8 shows an example arrangement for asynchronous remote calls with undo data structures according to an implementation of the disclosed subject matter.

FIG. 8 shows an example arrangement for asynchronous remote calls with undo data structures according to an implementation of the disclosed subject matter. At time 801, the commitment of database transaction may begin. For example, the database client 110 on the computing device 100 may being committing a database transaction to the local database 200. During time period 805, a remote call may be prepared. For example, the database client 110 may prepare a remote call associated with the database transaction, register the remote call with the listener process 120, and generate and store the undo data structure 205 for undoing the remote call in the storage 160.

At time 806, the remote call may be transmitted to a remote computing device for remote execution, and the database transaction may be started in a local database. For example, the database client 110 may transmit the remote call to the remote computing device 250, calling a remote service and starting remote execution. The database client 110 may then begin the database transaction in the local database 200.

During time period 807, the database transaction and remote call may both proceed concurrently and asynchronously. For example, the remote call may be received at the remote computing device 250, which may execute the remote call, for example, executing code for the remote service called by the remote call. The database transaction may proceed in the local database 200, for example, with the database client 110 executing code to perform the database transaction.

At time 809, the database transaction may complete. For example, the database client 110 may finish executing any code necessary for the database transaction in the local database 200. The database transaction may not yet be committed to the local database 200.

During time period 811, the commitment of the database transaction may wait until the remote call has successfully completed. For example, the database client 110 may wait to commit the database transaction until the listener process 120 has received a message from the remote computing device 250 indicating that the remote call completed successfully. If the remote computing device 250 completes the remote call before the database client 110 finishes performing the database transaction in the local database 200, the time period 211 may have a length of zero. The maximum amount of time the time period 211 may last may be set by the time out length used by the listener process 120 when waiting for the message indicating success of the remote call from the remote computing device 250.

At time 812, a success message may be received. For example, the remote computing device 250 may, after successfully completing the remote call, sending a message indicating the success of the remote call to the computing device 100. The message may be received by the listener process 120, which may have been listening for the message. The message may include any suitable identifiers for the remote call that the listener process 120 may recognize.

During time period 813, work to commit the database transaction may be performed. For example, the listener process 120 may notify that the database client 110 that the remote call was successful. The database client 110 may perform any work necessary to commit the database transaction to the local database 200.

At time 820, the database transaction may be committed. For example, database client 110 may have committed the database transaction to the local database 200 after the database transaction and the remote call were both successful. The listener process 120 may delete the undo data structure 205 that undoes the remote call from the storage 160.

If the either the database transaction or the remote call fails at any point after the time period 805, the database client 110 may rollback the database transaction in the local database 200, and the listener process 120 may send the undo data structure 205 that undoes the remote call to the remote computing device 250 and then delete the undo data structure 205 from the storage 106.

Figure 9:
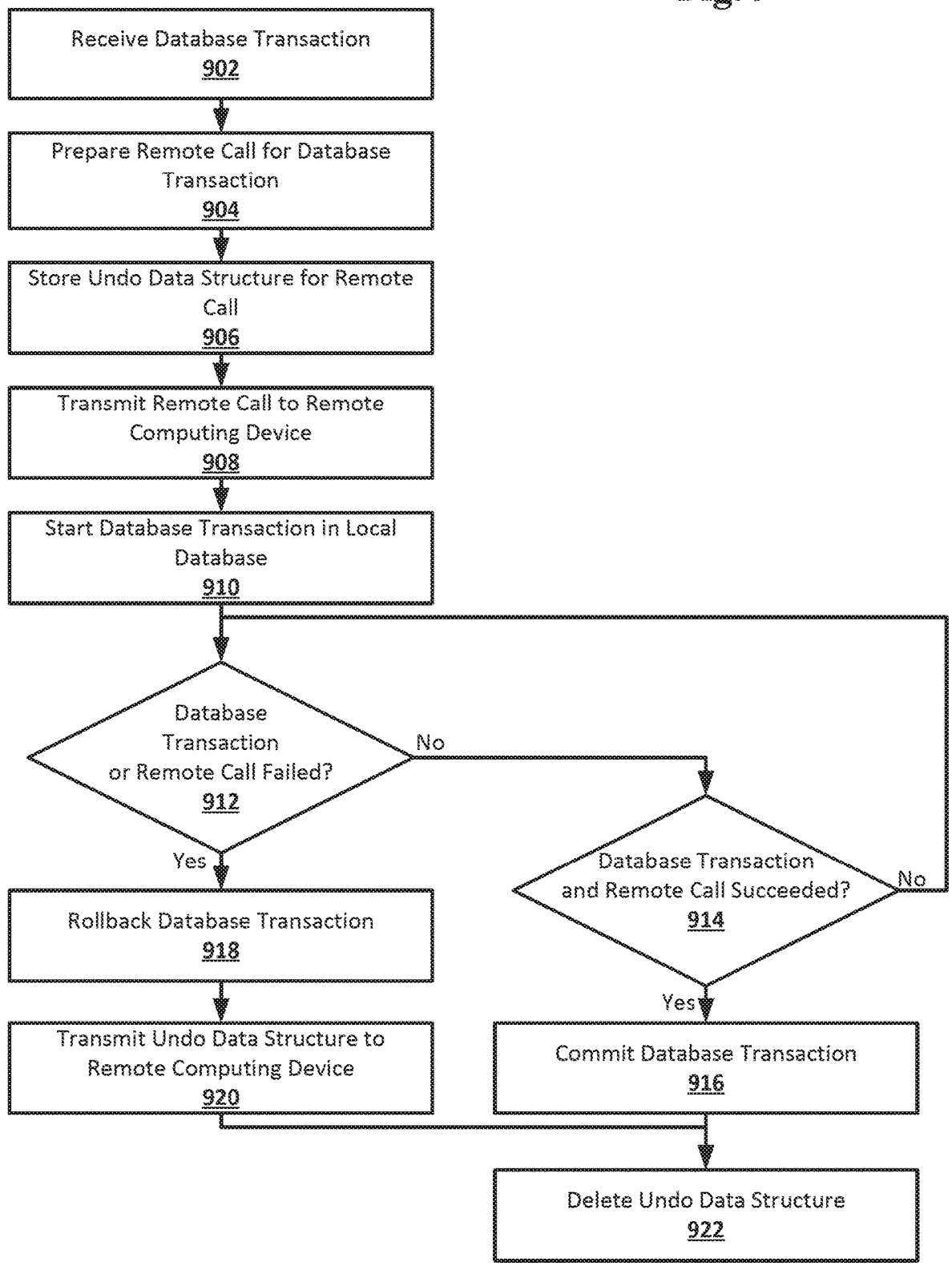
FIG. 9 shows an example procedure suitable for asynchronous remote calls with undo data structures according to an implementation of the disclosed subject matter.

FIG. 9 shows an example procedure suitable for asynchronous remote calls with undo data structures according to an implementation of the disclosed subject matter. At 902, a database transaction may be received. For example, a database transaction may be received at the database client 110 on the computing device 100. The database transaction may have been generated in any suitable manner, including, for example, on the computing device 100 or on separate computing device. For example, the database transaction may be generated through an order submitted through a webpage hosted by the computing device 100 or a server system of which the computing device 100 is a part.

At 904, a remote call may be prepared for the database transaction. For example, the database transaction received at the database client 110 may have an associated remote call. The remote call may be a remote procedure call made to a remote service on the remote computing device 250 that may make some change to the remote computing device 250, such as, for example, to a database in a storage of the remote computing device 250. The database client 110 may prepare the remote call to be transmitted to the remote computing device 250. For example, the database client 110 may register the remote call with the listener process 120, for example, providing any suitable identifiers for the remote call to the listener process 120, so that the listener process 120 may listen for messages from the remote computing device 250 regarding the status of the remote call.

At 906, an undo data structure may be stored for the remote call. For example, the database client 110 may generate and store the undo data structure 205 for the remote call associated with the database transaction. The undo data structure 205 may be a data structure that, when executed by a computing device that executed the remote call, undoes any changes made by the remote call. The undo data structure 205 may be in any suitable format and include any suitable data, including, for example, identifiers for the remote call and instructions for undoing the remote call. For example, if the remote call makes a reservation in a reservation system, the undo data structure 205 may include instructions that cancel that reservation. The undo data structure 205 may be stored in the storage 160.

At 908, the remote call may be transmitted to a remote computing device. For example, the database client 110 may transmit the remote call to the remote computing device 250 to be executed, calling the remote service specified in the remote call. The remote computing device 250, on receiving the remote call, may run the remote service according to any parameters in the remote call, executing the remote call.

At 910, the database transaction may be started in a local database. For example, the database client 110 may start the database transaction in the local database 200, which may be local to the computing device 100. The database client 110 may start execution of code that makes changes to the local database 200, for example, adding, deleting, to perform the database transaction.

At 912, if the database transaction or remote call fail, flow may proceed to 918, where the database transaction may be rolled back. Otherwise, flow may proceed to 914. For example, while the database client 110 performs the database transaction in the local database 200, the listener process 120 may listen for a message from the remote computing device 250 indicating the success or failure of the remote call. If the listener process 120 receives a message from the remote computing device 250 indicating that the remote call has failed, or times out waiting for a message from the remote computing device 250 and not receiving one, the listener process 120 may consider the remote call to have failed. If the database client 110 is unable to complete the database transaction in the local database 110 for any reason, the database client 110 may determine that the database transaction in the local database 200 has failed.

At 914, if the database transaction and remote call have succeeded, flow may proceed to 916, where the database transaction may be committed. Otherwise, flow may proceed back to 912, as one or both of the database transaction and remote call may be still be in progress, having neither succeeded nor failed.

At 916, the database transaction may be committed. For example, the database transaction and remote call may both have succeeded. The listener process 120 may have received a message indicating the success of the remote call from the remote computing device 250, and may have notified the database client 110 that the remote call was successful. The database client 110 may commit the completed database transaction to the local database 200, as success of the remote call may ensure that state of the remote computing device 250, for example, a state of a database local to the remote computing device 250, will be consistent with the local database 200 including the committed database transaction.

At 918, the database transaction may be rolled back. For example, either or both of the database transaction and the remote call may have failed. The database client 110 may rollback the database transaction in the local database 200, reversing any changes made by the performance of the database transaction up to the point of the rollback.

At 920, the undo data structure may be transmitted to the remote computing device. For example, after the database client 110 rolls back the database transaction in the local database 200, the listener process 120 may transmit the undo data structure 205 to be remotely executed on the remote computing device 250. The remote execution of the undo data structure 205 may undo any changes made by the remote call to the remote computing device 250 up to the point that the undo data structure 205 is remotely executed on the remote computing device 250. This may maintain consistency between the remote computing device 250 and the local database 200 after the rollback of the database transaction by the database client 100.

At 922, the undo data structure may be deleted. For example, the listener process 120 may delete the undo data structure 205 from the storage 206 after the database transaction is committed, or after the undo data structure 205 is transmitted to the remote computing device 250 in response to either the database transaction or remote call failing and the database transaction being rolled back.

Figure 10:
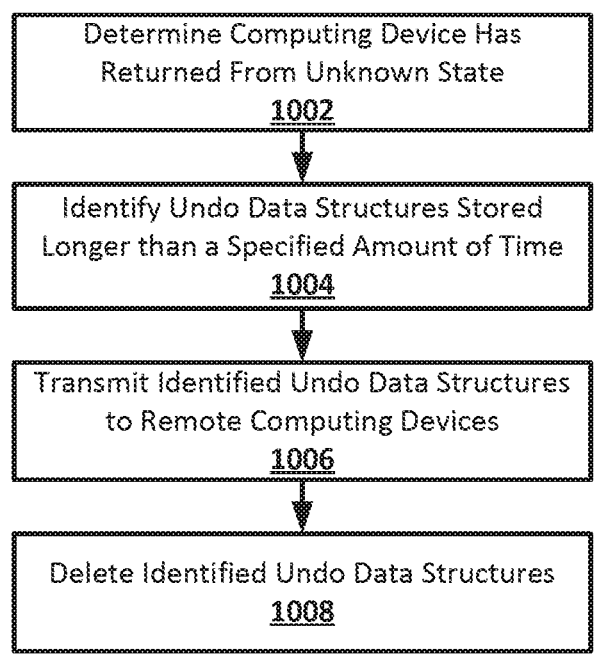
FIG. 10 shows an example procedure suitable for asynchronous remote calls with undo data structures according to an implementation of the disclosed subject matter.

FIG. 10 shows an example procedure suitable for asynchronous remote calls with undo data structures according to an implementation of the disclosed subject matter. At 1002, it may be determined that a computing device has returned from an unknown state. For example, the computing device 100 may crash, freeze, hang, or lose power, and then restart. On returning to operation, the listener process 120 may determine that the computing device 100 has returned from an unknown state.

At 1004, undo data structures that have been stored longer than a specified amount of time may be identified. For example, the listener process 120 may check the undo data structures 162, including the undo data structures 701, 702, 703, and 704, to determine how long they have been stored in the storage 160. The listener process 120 may identify any of the undo data structures 162 that have been stored for longer than a specified amount of time. For example, the specified amount of time may be one minute, and the listener process 120 may identify the undo data structures 701, 702, and 703 as having been stored in the storage 160 for longer than one minute.

At 1006, the identified undo data structures may be transmitted to remote computing devices. For example, the undo data structures identified by the listener process 120 as having been stored in the storage 160 for longer than the specified amount of time, for example, the undo data structures 701, 702, and 703, may be transmitted to remote computing devices, such as the remote computing devices 250 and 750. The database client 110 may have been performing database transactions in the local database 200 when the computing device 100 entered the unknown state, resulting in failure of the database transactions. The undo data structures 701, 702, and 703 identified by the listener process 120 may be for undoing the remote calls associated with the database transactions that failed when the computing device 100 entered the unknown state. The listener process 120 may transmit each of the undo data structures 701, 702, and 703 to the same remote computing device as the remote call the undo data structure is meant to undo. For example, the remote calls undone by the undo data structures 701 and 702 may have been transmitted to the remote computing device 250, so the listener process 120 may transmit the undo data structures 701 and 702 to the remote computing device 250. The remote call undone by the undo data structure 703 may have been transmitted to the remote computing device 750, so the listener process 120 may transmit the undo data structure 703 to the remote computing device 750

At 1008, the identified undo data structures may be deleted. For example, the listener process 120 may delete the identified undo data structures 701, 702, and 703 from the storage 160 after transmitting them to the remote computing devices 250 and 750. Undo data structures in the storage 160 that were not identified as having been stored longer than the specified amount of time, such as the undo data structure 704, may not be deleted, as they may be for undoing remote call associated with database transactions that were started after the computing device 100 returned from the unknown state.

Figure 11:
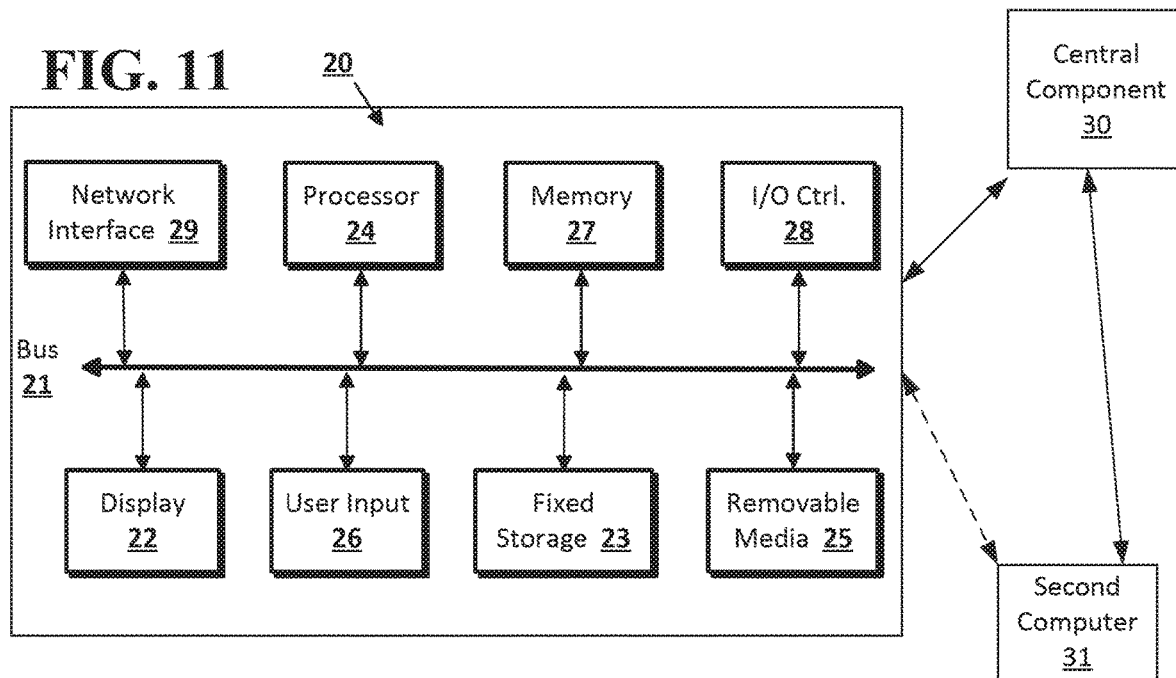
FIG. 11 shows a computer according to an implementation of the disclosed subject matter.

Implementations of the presently disclosed subject matter may be implemented in and used with a variety of component and network architectures. FIG. 11 is an example computer 20 suitable for implementing implementations of the presently disclosed subject matter. As discussed in further detail herein, the computer 20 may be a single computer in a network of multiple computers. As shown in FIG. 11, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, widearea, or other networks, as shown in FIG. 12.

Many other devices or components (not shown) may be connected in a similar manner (e.g., document scanners, digital cameras and so on). Conversely, all of the components shown in FIG. 11 need not be present to practice the present disclosure. The components can be interconnected in different ways from that shown. The operation of a computer such as that shown in FIG. 11 is readily known in the art and is not discussed in detail in this application. Code to implement the present disclosure can be stored in computerreadable storage media such as one or more of the memory 27, fixed storage 23, removable media 25, or on a remote storage location.

Figure 12:
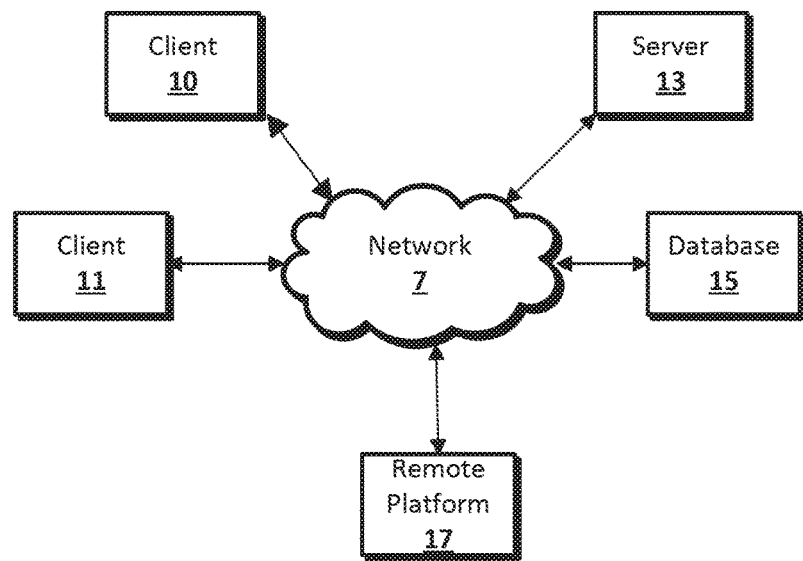
FIG. 12 shows a network configuration according to an implementation of the disclosed subject matter.

FIG. 12 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising for maintaining consistency between a local database and a remote computing device:
    preparing, on a computing device, a remote call associated with a database transaction in the local database;
    storing, by the computing device in storage accessible to the computing device, an undo data structure for the remote call;
    transmitting, by the computing device, the remote call associated with the database transaction to the remote computing device to be executed by the remote computing device;
    beginning, by the computing device, performance of the database transaction in the local database;
    determining, by the computing device, that at least one of the performance of the database transaction and the remote call has failed; and
    transmitting, by the computing device, the undo data structure to the remote computing device to be remotely executed.

2. The computer-implemented method of claim 1, further comprising:
    deleting, by the computing device, the undo data structure from the storage accessible to the computing device.

3. The computer-implemented method of claim 1, wherein determining, by the computing device, that at least one of the commitment of the database transaction and the remote call has failed further comprises receiving an indication that the remote call has failed or timed out.

4. The computer-implemented method of claim 1, wherein determining, by the computing device, that at least one of the commitment of the database transaction and the remote call has failed further comprises failing, by the computing device, to perform the database transaction in the local database.

5. The computer-implemented method of claim 1, wherein determining, by the computing device, that at least one of the commitment of the database transaction and the remote call has failed further comprises determining that the computing device has restarted from an unknown state, and further comprising:
    transmitting, by the computing device, undo data structures that have been stored in the storage accessible to the computing device longer than a specified amount of time to one or more remote computing devices to be remotely executed; and
    deleting, by the computing device, the undo data structures that have been stored in the storage accessible to the computing device longer than a specified amount of time from the storage accessible to the computing device.

6. The computer-implemented method of claim 1, further comprising:
    preparing, on the computing device, a second remote call associated with a second database transaction in the local database;
    storing, by the computing device, in the storage accessible to the computing device, a second undo data structure for the second remote call;
    transmitting, by the computing device, the second remote call associated with the second database transaction to the remote computing device to be executed by the remote computing device;
    beginning, by the computing device, performance of the second database transaction in the local database; determining, by the computing device, that the second database transaction in the local database was successful;
    receiving, by the computing device, an indication that the second remote call was executed successfully on the remote computing device;
    committing, by the computing device, the second database transaction in the local database; and
    deleting, by the computing device, the second undo data structure from the storage accessible to the computing device.

7. The computer-implemented method of claim 1, wherein the undo data structure comprises at least one instruction for undoing changes made by execution of the remote call on the remote computing device.

8. The computer-implemented method of claim 1, wherein the database transaction and the remote call are asynchronous.

9. A computer-implemented system for asynchronous remote calls with undo data structures for maintaining consistency between a local database and a remote computing device comprising:
    one or more storage devices;
    the local database; and
    a processor that prepares a remote call associated with a database transaction in the local database, stores, in the one or more devices, an undo data structure for the remote call, transmits the remote call associated with the database transaction to the remote computing device to be executed by the remote computing device, begins performance of the database transaction in the local database, determines that at least one of the performance of the database transaction and the remote call has failed, and transmits the undo data structure to be the remote computing device to be remotely executed.

10. The computer-implemented system of claim 9, wherein the processor further deletes the undo data structure from the one or more storage devices.

11. The computer-implemented system of claim 9, wherein the processor determines that at least one of the commitment of the database transaction and the remote call has failed by receiving an indication that the remote call has failed or timed out.

12. The computer-implemented system of claim 9, wherein the processor determines that at least one of the commitment of the database transaction and the remote call has failed when the processor fails to perform the database transaction in the local database.

13. The computer-implemented system of claim 9, wherein the processor determines that at least one of the commitment of the database transaction and the remote call has failed further comprises by determining that the computing device has restarted from an unknown state, and wherein the processor further transmits undo data structures that have been stored in the one or more storage devices longer than a specified amount of time to one or more remote computing devices to be remotely executed, and deletes the undo data structures that have been stored in the one or more storage devices longer than a specified amount of time from the one or more storage devices.

14. The computer-implemented system of claim 9, wherein the processor further prepares a second remote call associated with a second database transaction in the local database, stores, in the one or more storage devices, a second undo data structure for the second remote call, transmits the second remote call associated with the second database transaction to the remote computing device to be executed by the remote computing device, begins performance of the second database transaction in the local database, determines that the second database transaction in the local database was successful, receives an indication that the second remote call was executed successfully on the remote computing device, commits the second database transaction in the local database, and deletes the second undo data structure from the one or more storage devices.

15. The computer-implemented system of claim 9, wherein the undo data structure comprises at least one instruction for undoing changes made by execution of the remote call on the remote computing device.

16. The computer-implemented system of claim 9, wherein the database transaction and the remote call are asynchronous.

17. A system comprising: one or more computers and one or more storage devices storing instructions which are operable, when executed by the one or more computers, to cause the one or more computers to perform operations for maintaining consistency between a local database and a remote computing device comprising:

preparing a remote call associated with a database transaction in the local database;

storing, in a storage, an undo data structure for the remote call;

transmitting the remote call associated with the database transaction to the remote computing device to be executed by the remote computing device;

beginning performance of the database transaction in the local database;

determining that at least one of the performance of the database transaction and the remote call has failed; and transmitting the undo data structure to the remote computing device to be remotely executed.

18. The system of claim 17, wherein the instructions cause the one or more computers to further perform operations further comprising:

deleting the undo data structure from the storage.

19. The system of claim 17, wherein the instructions that cause the one or more computers to perform operations comprising determining that at least one of the commitment of the database transaction and the remote call has failed further comprises determining that the computing device has restarted from an unknown state, and wherein the instructions further cause the one or more computers to perform operations comprising:

transmitting undo data structures that have been stored in the storage longer than a specified amount of time to one or more remote computing devices be remotely executed; and deleting the undo data structures that have been stored in the storage accessible to the computing device longer than a specified amount of time from the storage.

20. The system of claim 17, wherein the instructions cause the one or more computers to further perform operations comprising:

preparing a second remote call associated with a second database transaction in the local database;

storing, in the storage, a second undo data structure for the second remote call;

transmitting the second remote call associated with the second database transaction to the remote computing device to be executed by the remote computing device;

beginning performance of the second database transaction in the local database;

determining that the second database transaction in the local database was successful;

receiving an indication that the second remote call was executed successfully on the remote computing device;

committing the second database transaction in the local database; and deleting the second undo data structure from the storage.

* * * * *